(12) United States Patent
Ye et al.

(10) Patent No.: US 11,362,879 B2
(45) Date of Patent: Jun. 14, 2022

(54) CONSTELLATION ROTATION METHOD AND BASE STATION

(71) Applicant: NTT DoCoMo, Inc., Tokyo (JP)

(72) Inventors: Neng Ye, Beijing (CN); Xiangming Li, Beijing (CN); Xiaohang Chen, Beijing (CN); Xiaolin Hou, Beijing (CN); Qun Zhao, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 277 days.

(21) Appl. No.: 16/608,728

(22) PCT Filed: Mar. 20, 2018

(86) PCT No.: PCT/CN2018/079538
§ 371 (c)(1),
(2) Date: Oct. 25, 2019

(87) PCT Pub. No.: WO2018/196505
PCT Pub. Date: Nov. 1, 2018

(65) Prior Publication Data
US 2020/0195488 A1    Jun. 18, 2020

(30) Foreign Application Priority Data
Apr. 27, 2017 (CN) .......................... 201710286473.6

(51) Int. Cl.
*H04L 27/34* (2006.01)
*H04W 24/08* (2009.01)

(52) U.S. Cl.
CPC ......... *H04L 27/3444* (2013.01); *H04W 24/08* (2013.01)

(58) Field of Classification Search
CPC ............ H04L 27/3444; H04L 27/3872; H04B 7/0452; H04W 24/08
See application file for complete search history.

(56) References Cited

U.S. PATENT DOCUMENTS

| 8,811,539 B2 | 8/2014 | Maiberger et al. |
| 2015/0098531 A1 | 4/2015 | Riabkov et al. |

(Continued)

FOREIGN PATENT DOCUMENTS

| CN | 101136731 A | 3/2008 |
| CN | 102546114 A | 7/2012 |

(Continued)

OTHER PUBLICATIONS

International Search Report (in English and Chinese) issued in PCT/CN2018/079538, dated Jun. 21, 2018; ISA/CN.

(Continued)

*Primary Examiner* — Elton Williams
(74) *Attorney, Agent, or Firm* — Harness, Dickey & Pierce, P.L.C.

(57) ABSTRACT

A constellation rotation method is presented. The method includes: determining a statistical characteristic of a received signal of a Base Station (BS) according to a channel coefficient of one or more User Equipments (UEs), at least one of noise information and interference information, the received signal being a signal received by the BS through a physical channel from the one or more UEs; determining a constellation rotation angle of each UE according to the determined statistical characteristic of the received signal; and for each UE, rotating a constellation of a data stream of a UE according to the constellation rotation angle of the UE.

13 Claims, 3 Drawing Sheets

(56) References Cited

U.S. PATENT DOCUMENTS

2018/0013477 A1* 1/2018 Kim .................. H04B 7/06
2018/0083666 A1* 3/2018 Bayesteh ............. H04L 1/0041

FOREIGN PATENT DOCUMENTS

| CN | 102833043 A | 12/2012 |
| CN | 106302299 A | 1/2017 |

OTHER PUBLICATIONS

Chinese Office Action in counterpart CN2018800242613, dated Nov. 3, 2021.

* cited by examiner

CONSTELLATION ROTATION METHOD AND BASE STATION

This application is a 371 U.S. National Stage of International Application No. PCT/CN2018/079538, filed on Mar. 20, 2018, which claims priority to Chinese Patent Application No. 201710286473.6, filed on Apr. 27, 2017, and entitled "Constellation Rotation Method and Device", the entire contents of which are incorporated herein by reference.

FIELD OF THE DISCLOSURE

The present application relates to the technical field of mobile communication, particularly to a constellation rotation method and base station.

BACKGROUND

By a Non-Orthogonal Multiple Access (NOMA) technology, the uplink and downlink transmission performance for cell edge users and the system throughput may be remarkably improved. In addition, according to an information theory, by adjusting a constellation rotation angle of a User Equipment (UE), the transmission performance and throughput of a NOMA system can be further improved. Therefore, how to determine a constellation rotation angle of UE needs to be researched so as to optimize the transmission performance and throughput of a NOMA system.

SUMMARY

Embodiments of the present application disclose a constellation rotation method, including:

determining a statistical characteristic of a received signal of a Base Station (BS) according to a channel coefficient of one or more User Equipments (UEs), at least one of noise information and interference information, the received signal being a signal received by the BS through a physical channel from the one or more UEs;

determining a constellation rotation angle of each UE according to the determined statistical characteristic of the received signal; and for each UE, rotating a constellation of a data stream of a UE according to the constellation rotation angle of the UE.

The embodiments of the present application also disclose a constellation rotation method, including:

receiving a constellation rotation angle corresponding to a UE from a Base Station (BS), wherein the constellation rotation angle is determined by the BS according to a statistical characteristic of a received signal, the received signal is a signal received by the BS through a physical channel from one or more User Equipments (UEs), and the statistical characteristic of the received signal is determined by the BS according to a channel coefficient of the one or more UEs, at least one of noise information and interference information; and rotating a constellation of a data stream of the UE according to the constellation rotation angle.

Correspondingly, the embodiments of the present application disclose a BS, including:

a processor; and a memory connected with the processor. Machine-readable instruction modules are stored in the memory. The machine-readable instruction modules include:

a model establishment module, configured to determine a statistical characteristic of a received signal of a Base Station (BS) according to a channel coefficient of one or more User Equipments (UEs), at least one of noise information and interference information, the received signal being a signal received by the BS through a physical channel from the one or more UEs;

a constellation rotation angle determination module, configured to determine a constellation rotation angle of each UE according to the determined statistical characteristic of the received signal; and a constellation rotation module, configured to for each UE, rotate a constellation of a data stream of a UE according to the constellation rotation angle of the UE.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
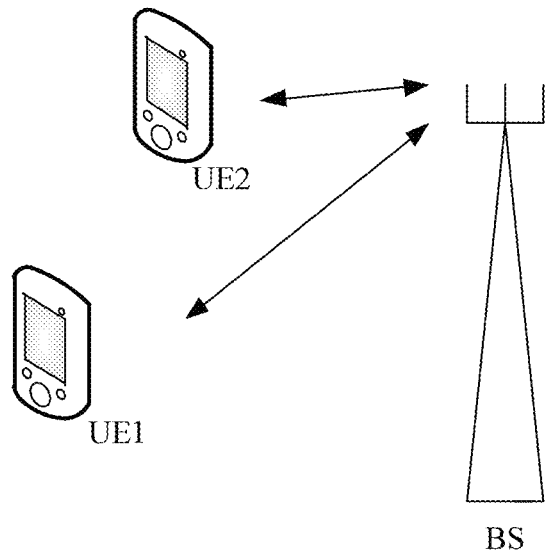
FIG. 1 shows an example of an access network of a wireless communication system according to an embodiment of the present application.

The technical solutions in the embodiments of the present invention will be clearly and completely described below in combination with the drawings in the embodiments of the present invention. It is apparent that the described embodiments are not all embodiments but part of embodiments of the present invention. All other embodiments obtained by those of ordinary skill in the art based on the embodiments in the present invention without creative work shall fall within the scope of protection of the present invention.

For concise and intuitive description, a plurality of representative embodiments will be described below to elaborate the solutions of the present invention. A huge number of details in the embodiments are adopted only to help the solutions of the present invention to be understood. However, it is apparent that the technical solutions of the present invention may not be limited to these details during implementation. For avoiding unnecessary ambiguities of the solutions of the present invention, some implementation modes are not described in detail and only frameworks are presented. In the following, "include" refers to "include but not limited to", and "according to . . . " refers to "at least according to . . . , but not limited to only . . . ". If the number of a component is not particularly indicated below, it means that there may be one or more such components, or it may be understood as at least one.

As described above, by adjusting a constellation rotation angle of a UE, transmission performance and throughput of a NOMA system can be further improved. However, How to determine a constellation rotation angle of a UE in order to maximize the system throughput is a very complex problem. In the prior art, all possible constellation rotation angles may be traversed by an exhaustion method to find an optimal constellation rotation angle in terms of system performance. However, the calculation complexity of such a processing manner is very high; a BS requires a large amount of hardware resources for calculation and storage; flexibility is low, and it is inapplicable to a real-time service. In addition, except the above-described method, in a second method, all the possible constellation rotation angles may be traversed (or by using a common maximal/minimal optimization method in optimization theories) to find a constellation rotation angle which can maximize a distance between two closest constellation points in an overall constellation (or a composite constellation or a superimposed constellation) at a receiver. It is understandable for those skilled in the art that, the calculation complexity can be reduced to a certain extent by the second method, but the influence of noise is not considered in this method, so under the condition of a relatively low signal-to-noise ratio, the constellation rotation angle determined is not an optimal constellation rotation angle, i.e., the system performance and the throughput may not be optimized by this method.

Based on the foregoing descriptions, the embodiments of the present application disclose a constellation rotation method, which may be applied to determine a constellation rotation angle for a UE in uplink and downlink. In addition, according to the method disclosed in the embodiment of the present application, not only small-scale channel information such as a channel coefficient of the UE is considered, but also large-scale channel information such as a signal-to-noise ratio of the UE is considered, so that high system performance and throughput may be obtained by the determined constellation rotation angle of the UE under various signal-to-noise ratio conditions. Moreover, calculation complexity of the method is very low, so that the calculation burden of a BS may be reduced, a calculation delay and the power consumption of the BS may be reduced, and meanwhile, requirements on calculation and storage hardware resources at the BS may also be reduced.

FIG. 1 shows an example of an access network of a wireless communication system according to an embodiment of the present application. From FIG. 1, it can be seen that a wireless communication system in the embodiment of the present application may include at least one BS and at least two UEs, for example, UE1 and UE2. The UE1 and the UE2 may access the BS in a NOMA manner. Since the UE1 and the UE2 multiplex a same time-frequency resource in a non-orthogonal manner, the transmission performance and throughput of the system may be improved by rotating a constellation of the UE. In the system shown in FIG. 1, assume the UE2 does not perform constellation rotation, and a constellation rotation angle of the UE1 is $\varphi$ (that is, by referring to a constellation of the UE2, the rotation angle of a constellation of the UE1 is $\varphi$), a signal received by the BS may be shown as the following formula (1):

$$y^{\varphi}=x_1 \cdot e^{j\varphi}+x_2+n_0=x_1^{\varphi}+x_2+n_0 \qquad (1)$$

wherein $y^{\varphi}$ is the received signal of the BS, $x_1$ is a signal received by the BS after the UE1 sends a signal without performing constellation rotation, and the signal passes a physical channel (i.e., being attenuated and faded), i.e., the signal $x_1$ is obtained by multiplying a modulation symbol of the UE1 by a channel coefficient, $x_1 \cdot e^{j\varphi}$ is a signal received by the BS after UE1 performs constellation rotation, and sends the signal to pass the physical channel, $x_2$ is a signal received by the BS after a signal sent by the UE2 passes the physical channel, and $\varphi$ is the rotation angle of the constellation of the UE1 relative to its own original constellation.

In addition, let $y^{\varphi} \sim P_{Y^{\varphi}}(y^{\varphi})$, $x_1^{\varphi} \sim P_{X_1^{\varphi}}(x_1^{\varphi})$, $x_2 \sim P_{X_2}(x_2)$ and $n_{0,r} \sim CN(0,\sigma_0^2 I_t)$ wherein $y^{\varphi} \sim P_{Y^{\varphi}}(y^{\varphi})$ represents that a distribution function of a random variable $y^{\varphi}$ is $P_{Y^{\varphi}}(y^{\varphi})$. The distribution function $P_{Y^{\varphi}}(y^{\varphi})$ is uniquely determined by a channel coefficient(s) of a UE(s), a sending constellation(s) of the UE(s) and a rotation angle(s) of the constellation(s) of the UE(s). $x_1^{\varphi} \cdot P_{X_1^{\varphi}}(x_1^{\varphi})$ represents that a distribution function of a random variable $x_1^{\varphi}$ is $P_{X_1^{\varphi}}(x_1^{\varphi})$, wherein the distribution function $P_{X_1^{\varphi}}(x_1^{\varphi})$ is uniquely determined by the channel coefficient of the UE1, the sending constellation of the UE1 and the rotation angle of the UE1. $x_2 \sim P_{X_2}(x_2)$ represents that a distribution function of a random variable $x_2$ is $P_{X_2}(x_2)$, wherein the distribution function $P_{X_2}(x_2)$ is uniquely determined by the channel coefficient of the UE2 and the sending constellation of the UE2. $n_{0,r} \sim CN(0,\sigma_0^2 I_t)$ represents that a random variable $n_{0,r}$ follows a circular symmetric complex Gaussian noise distribution function $CN(0,\sigma_0^2 I_t)$.

Assume $Y^{\varphi}$ is a random variable of a receiver signal, $X_1^{\varphi}$ is a set of all possible $x_1 \cdot e^{j\varphi}$, $X_2$ is a set of all possible $x_2$, $|X_1^{\varphi}|$ is the number of elements in the set $X_1^{\varphi}$, $|X_2|$ is the number of elements in the set $X_2$, $n_{0,r}$ is the noise, $\sigma_0^2$ is a noise variance, $I_t$ is a unit diagonal matrix, t is the number of antennas at BS, and $CN(u,v)$ is a circular symmetric complex Gaussian distribution with a mean value u and a variance v.

As described above, the system performance may be improved by constellation rotation. Therefore, the main problem to be solved by the embodiment of the present application is how to determine a value of $\varphi$ to maximize the system throughput and optimize the transmission performance of the system.

According to the above-described expression of the received signal of the BS, it may be determined that an optimization objective for the system performance and the throughput is equivalent to finding the constellation rotation angle $\varphi$ which maximizes a value of the expression $I(Y^{\varphi};X_1^{\varphi})$, wherein $I(A;B)$ represents a mutual information function of random variables A and B.

However, it is understandable for those skilled in the art that, the calculation complexity for achieving the above-described objective is very high, and it is hard to figure out rapidly in the practical application, so that the optimization objective is required to be further converted.

Therefore, in some embodiments of the present application, a mixed-Gaussian model is proposed, and a random variable of the receiver signal is modeled based on the mixed-Gaussian model, thus a mixed-Gaussian model-based random variable $Y^{\varphi}$ of the received signal can be obtained. It can be seen that a distribution function thereof may be shown as the following formula (2):

$$Y^\varphi \sim \sum_{x_{1,j}^{\varphi_1} \in X_1^{\varphi_1}, x_{2,k}^{\varphi_2} \in X_2^{\varphi_2}, \ldots, x_{N,l}^{\varphi_N} \in X_N^{\varphi_N}} \frac{1}{|X_1^{\varphi_1}| \times |X_2^{\varphi_2}| \times \ldots \times |X_N^{\varphi_N}|} \quad (2)$$

$$CN(x_{1,j}^{\varphi_1} + x_{2,k}^{\varphi_2} + \ldots + x_{N,l}^{\varphi_N}, \sigma_0^2 I)$$

wherein $Y^\varphi$ is the random variable of the receiver signal, $x_{1,j}^{\varphi_1}$ is a signal received by a receiver after the UE1 rotates the constellation by an angle $\varphi_1$ and then sends the signal to pass the physical channel, $X_1^{\varphi_1}$ is a constellation point set received by the receiver after all possible constellation points sent by the UE1 pass the physical channel, $X_{2,k}^{\varphi_2}$ is a signal received by the BS after the UE2 rotates the constellation by an angle $\varphi_2$ and then sends the signal to pass the physical channel, $X_2^{\varphi_2}$ is a constellation point set received by the receiver after all possible constellation points sent by the UE2 pass the physical channel, $X_{N,1}^{\varphi_N}$ is a signal received by the receiver after $UE_N$ rotates the constellation by an angle $\varphi_N$ and then sends the signal to pass the physical channel, $X_N^{\varphi_N}$ is a constellation point set received by the receiver after all possible constellation points sent by the $UE_N$ pass the physical channel, N is the number of the UE, $|X_1^{\varphi_1}|$ is the number of elements in the set $X_1^{\varphi_1}$, $|X_2^{\varphi_2}|$ the number of elements in the set $X_2^{\varphi_2}$, $|X_N^{\varphi_N}|$ is the number of elements in the set $X_N^{\varphi_n}$, $\sigma_0^2$ is the noise variance, I is the unit diagonal matrix, and CN(u,v) is the circular symmetric complex Gaussian distribution with the mean value u and the variance v.

In an example, when the number of the UE is 2, the distribution function of the mixed-Gaussian model-based random variable of the received signal may be shown as the following formula (3):

$$Y^\varphi \sim \sum_{x_{1,j}^\varphi \in X_1^\varphi} \sum_{x_{2,k} \in X_2} \frac{1}{|X_1^{\varphi_1}| \times |X_2^{\varphi_2}|} CN(x_{1,j}^\varphi + x_{2,k}, \sigma_0^2 I) \quad (3)$$

In another example, when the number of the UE is 3, the distribution function of the mixed-Gaussian model-based random variable of the received signal may be shown as the following formula (4):

$$Y^\varphi \sim \quad (4)$$

$$\sum_{x_{1,j}^{\varphi_1} \in x_1^{\varphi_1}, x_{2,k}^{\varphi_2} \in x_2^{\varphi_2}, x_{3,k} \in x_3} \frac{1}{|X_1^{\varphi_1}| \times |X_2^{\varphi_2}| \times |X_3|} CN(x_{1,j}^\varphi + x_{2,k}^{\varphi_1} + x_{3,k}, \sigma_0^2 I)$$

It can be seen that, for the random variable $Y^\varphi$ of the received signal obtained by the mixed-Gaussian model, the distribution function is related to small-scale channel information such as the channel coefficient of the UE ($x_{1,j}^\varphi$ and $x_{2,k}$ include the small-scale information such as the channel coefficient) and is also related to large-scale channel information such as a signal-to-noise ratio of the UE (the variance $\sigma^2$ of the Gaussian model represents the channel noise of the UE). Moreover, an entropy of the random variable of the received signal may be determined according to the distribution function of the random variable of the received signal. In an example, it is understandable for those skilled in the art that, if the distribution function of the random variable Y is denoted as f(y), an entropy of the random variable may be represented as h(Y)=∫f(y)log(f(y))dy, wherein h(Y) represents the entropy of the random variable Y. Here, the random variable Y is capitalized in order to distinguish from an integral variable y.

Moreover, it is proved by reasoning that, when the number of the UE is 2, an optimization objective of finding φ to maximize $I(Y^\varphi; X_1^\varphi)$ is equivalent to an optimization objective of finding φ to maximize $h(Y^\varphi)$, wherein h( ) refers to an entropy of the random variable $Y^\varphi$. Therefore, in the embodiment of the present application, after the distribution function of the mixed-Gaussian model-based random variable of the received signal of the UE is determined, the constellation rotation angle may be solved according to the distribution function to maximize the entropy of the random variable of the received signal, which is regarded as the constellation rotation angle of the UE.

As described above, when the number of the UE is 2, finding φ to maximize $h(Y^\varphi)$ is equivalent to finding φ to maximize $I(Y^\varphi; X_1^\varphi)$, so that the constellation rotation angle obtained by the above-described method may also maximize $I(Y^\varphi; X_1^\varphi)$, i.e., maximizing the system throughput. When the number of the UE is more than 2, finding φ to maximize $h(Y^\varphi)$ may also improve the system throughput to a great extent. That is, by maximizing the entropy of the mixed-Gaussian model-based random variable of the received signal, the system performance and the throughput may be optimized. In addition, the mixed-Gaussian model-based random variable of the received signal involves both the influence of the noise and amplitudes of different constellation points, i.e., both noise and the channel coefficient of the UE are considered, so that the value of φ obtained accordingly may be applied to different signal-to-noise ratio conditions and different constellations, and high accuracy may be achieved under the condition of a relatively high signal-to-noise ratio or a relatively low signal-to-noise ratio. Therefore, the method is high in flexibility and applied to a wide range of a signal-to-noise ratio. Moreover, a constellation form is not limited, and the method may be applied to various complex constellation forms, for example, Quadrature Amplitude Modulation (QAM).

Furthermore, for further reducing the calculation complexity when finding φ to maximize $h(Y^\varphi)$, $h(Y^\varphi)$ may be approximated to obtain a closed-form lower-bound expression $h^L(Y^\varphi)$ instead of $h(Y^\varphi)$, i.e., the constellation rotation angle φ which maximizes $h^L(Y^\varphi)$ is determined as the constellation rotation angle of the UE. In such case, the optimization objective is further converted into finding φ to maximize $h^L(Y^\varphi)$.

In some embodiments of the present application, when the number of the UE is 2, the closed-form lower-bound expression $h^L(Y^\varphi)$ of $h(Y^\varphi)$ may be shown as the following formula (5):

$$h^L(Y^\varphi) = \quad (5)$$
$$-\sum_{x_{JK}} \frac{1}{|X|} \log\left(\sum_{x_{LM}} \frac{1}{|X|} \exp\left(-t\log(4\pi\sigma^2) - \frac{1}{4\sigma^2}\|\mu_{j,k}^\varphi - \mu_{l,m}^\varphi\|^2\right)\right) =$$
$$C - \frac{1}{|X|}\sum_{x_{JK}} \log\left(\sum_{x_{LM}} \frac{1}{|X|} \exp\left(-\frac{1}{4\sigma^2}\|\mu_{j,k}^\varphi - \mu_{l,m}^\varphi\|^2\right)\right)$$

wherein C is a constant; $\|\mu_{j,k}^\varphi - \mu_{l,m}^\varphi\|^2$ represents a distance between two constellation points, specifically, $\mu_{j,k}^\varphi = [\text{Re}(x_{1,j}^\varphi + x_{2,k}) \quad \text{Im}(x_{1,j}^\varphi + x_{2,k})]^T$, $\mu_{l,m}^\varphi = [\text{Re}(x_{1,l}^\varphi + x_{2,m}) \quad \text{Im}(x_{1,l}^\varphi + x_{2,m})]^T$; X is given by $$\frac{1}{|x_1^\varphi| \times |x_2|};$$

$x_{1,j}{}^\varphi \in \chi_1{}^\varphi$, $x_{2,k} \in \chi_2$; $x_{1,l}{}^\varphi \in \chi_1{}^\varphi$, $x_{2,m} \in \chi_2$; t represents the number of the antennae; and $\sigma^2$ represents the noise variance.

From the formula (5), it can be seen that a lower-bound expression of the entropy of the mixed-Gaussian model-based random variable of the received signal is a closed-form expression, which can also be called as a closed-form lower-bound expression, so that the calculation complexity in finding a value of φ when maximizing it is low, only O(1), i.e., it is substantially unrelated to a constellation rotation angle. Therefore, the requirements on the calculation and storage hardware resources of the BS are low, the calculation delay is short, and it is more applicable to real-time application.

Based on the foregoing researches, an application environment of the foregoing concept may be further extended to the condition of non-Gaussian noise and/or interference, i.e., the mixed-Gaussian model is extended to a non-Gaussian environment, also called as a mixed model. In such case, a distribution function $f(x_{1,j}{}^{\varphi_1}, x_{2,k}{}^{\varphi_2}, \ldots, x_{N,l}{}^{\varphi_N})$ of the noise and/or the interference may be used to replace $CN(x_{1,j}{}^{\varphi_1} + x_{2,k}{}^{\varphi_2} + \ldots + x_{N,l}{}^{\varphi_N}, \sigma_0{}^2 I)$ in the formula (2), (3) or (4). Thus, the following formula (6) may be obtained as the distribution function of the random variable of the received signal in the non-Gaussian environment, and accordingly being used to calculate the entropy of the random variable of the received signal:

$$Y^\varphi \sim \sum_{x_{1,j}^{\varphi_1} \in X_1^{\varphi_1}, x_{2,k}^{\varphi_2} \in X_2^{\varphi_2}, \ldots, x_{N,l}^{\varphi_N} \in X_N^{\varphi_N}} \frac{1}{|X_1^{\varphi_1}| \times |X_2^{\varphi_2}| \times \ldots \times |X_N^{\varphi_N}|} f(x_{1,j}^{\varphi_1}, x_{2,k}^{\varphi_2}, \ldots, x_{N,l}^{\varphi_N}) \quad (6)$$

Meanings of each parameter may refer to the descriptions about the formula (2).

Furthermore, an Mth-order center distance, for example, a second-order center distance (i.e., the variance), of the received signal may also be adopted to replace the entropy of the random variable of the received signal, wherein M is a natural number more than or equal to 2. Under this condition, the Mth-order center distance of the received signal may be a suboptimal approximation of the entropy of the random variable of the received signal. In such case, when determining the constellation rotation angle of a UE, the constellation rotation angle which maximizes the Mth-order center distance of the received signal may be regarded as the constellation rotation angle of the UE.

Figure 2:
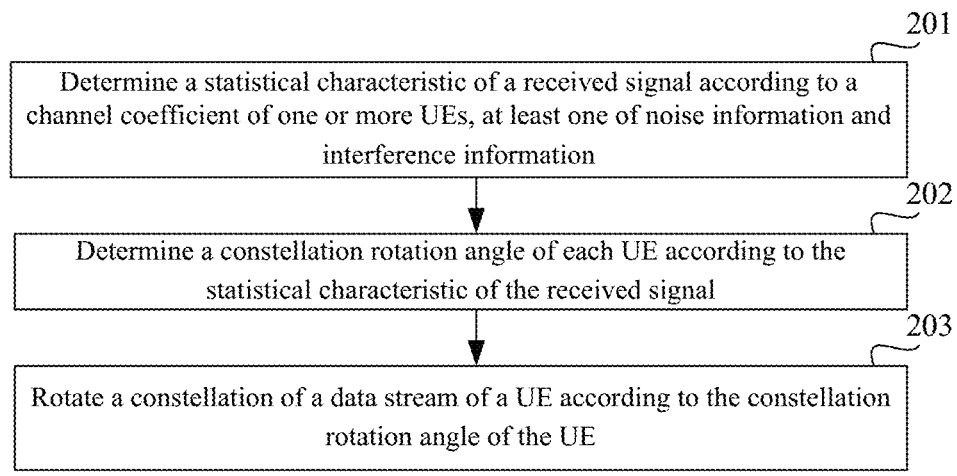
FIG. 2 shows a constellation rotation method applied to downlink data transmission according to an embodiment of the present application.

Based on the foregoing descriptions, the present application provides a constellation rotation method. The method may be applied to downlink data transmission, and may be executed by a BS. FIG. 2 shows a constellation rotation method applied to downlink data transmission. As shown in FIG. 2, the method includes the following steps.

In Step 201, the BS determines a statistical characteristic of a received signal according to a channel coefficient of one or more UEs, at least one of noise information and interference information.

In some embodiments of the present application, the above-described statistical characteristic of the received signal may specifically refer to an entropy of a random variable of the received signal, which is determined by the BS according to the channel coefficient of the one or more UEs, at least one of the noise information and the interference information. Particularly, for a specific Multi-User Shared Transmission (MUST) scenario, signals of multiple UEs may be modeled as a mixed-Gaussian model, and in such case, the statistical characteristic of the received signal may specifically refer to the entropy of the random variable of the received signal, which is determined by the BS according to the channel coefficient of the one or more UEs, at least one of the noise information and the interference information, and based on the mixed-Gaussian/non-Gaussian model.

In some embodiments of the present application, the BS may acquire the channel coefficients of multiple UEs by channel measurement respectively. In some embodiments of the present application, a channel noise may be fixed or be set according to a present system or the channel condition, for example, it is set as −110 dBm.

In some embodiments of the present application, determining the entropy of the random variable of the received signal may include the following two steps: determining a distribution function of the random variable of the received signal; and determining the entropy of the random variable of the received signal according to the distribution function of the random variable of the received signal.

The above-described random variable of the received signal is a transformation of the random variable of the received signal at the BS side, and the distribution function thereof may specifically refer to the above-described formula (2), (3), (4) or (6), i.e., the distribution function of the random variable of the received signal is determined according to the number of elements in a constellation point set at the receiver after all possible constellation points sent by each UE pass a physical channel and the distribution function of the noise and/or the interference. Moreover, the distribution function of the random variable of the received signal is associated with small-scale channel information (for example, the channel coefficient) and large-scale channel information (for example, a statistical value of the signal-to-noise ratio) of the UE. In a Gaussian environment, the distribution function of the noise and/or the interference is a circular symmetric Gaussian distribution function, of which a mean value is a sum of the signals of UEs received by the receiver, and of which a variance is a noise variance. From the foregoing descriptions, it can be seen that the entropy of the mixed-Gaussian model-based random variable of the received signal may be obtained through the distribution function.

In some other embodiments of the present application, for further reducing the calculation complexity, the entropy of the random variable of the received signal may be approximated to obtain a closed-form lower-bound expression to represent the entropy of the random variable of the received signal. Specifically, the closed-form lower-bound expression may be shown as the above-described formula (5).

In addition, in some other embodiments of the present application, the statistical characteristic of the received signal may specifically refer to an Mth-order center distance of the received signal, determined by the BS according to the channel coefficient of the one or more UEs, at least one of the noise information and the interference information, wherein M is a natural number more than or equal to 2.

In Step 202, the BS determines a constellation rotation angle of each UE according to the statistical characteristic of the received signal.

As described above, the random variable of the received signal is a transformation of the random variable of the received signal at the BS side, and it may be proved by reasoning that the system throughput may be maximal or approximately maximal when the entropy of the random variable of the received signal is maximal.

Therefore, in some embodiments of the present application, the entropy of the random variable of the received signal may be determined as the above-described statistical characteristic, and a constellation rotation angle maximizing the entropy of the random variable of the received signal is determined as the constellation rotation angle corresponding to each UE.

In addition, in some other embodiments of the present application, the Mth-order center distance of the received signal may be determined as a suboptimal approximation of the entropy of the random variable of the received signal, i.e., the Mth-order center distance of the received signal may be determined as the above-described statistical characteristic, and a constellation rotation angle maximizing the Mth-order center distance of the received signal is determined as the constellation rotation angle corresponding to each UE.

The constellation rotation angle of each UE may be determined by the operations in Step 201 and Step 202. That is, a constellation rotation angle determination method is provided by Step 201 and Step 202, and the method may be applied to downlink data transmission.

In Step 203, for each UE, the BS rotates a constellation of a data stream of a UE according to the constellation rotation angle of the UE.

In some embodiments of the present application, the constellation of each UE may be rotated after a symbol to be transmitted of each UE is mapped to an antenna array. In such case, the BS as a transmitter, performs constellation rotation for modulation constellations of data streams of multiple UEs, superimposes the constellation rotated signals (i.e., data streams) of UEs, and sends the superimposed signal simultaneously to UEs in a cell. An modulation manner is adopted for each stream independently. A receiver corresponds to a certain user (usually a cell center user) in the system.

In some embodiments, the constellation of the UE may be rotated by the following methods. In a downlink NOMA system, specifically regarding a two-user scenario based on a MUST technology in 3GPP Release-14 (R-14), the following two methods are provided (wherein UE1 uses any kind of modulation, and UE2 uses a Quadrature Phase Shift Keying (QPSK) modulation).

A first method:

At the BS, after symbols to be transmitted of the two UEs are mapped to the antenna array, a signal component on each antenna may be adjusted through the following formula (7), thereby implementing constellation rotation with a rotation angle φ:

$$x = e^{j\phi_0\pi}c(I-d) + e^{j(\phi_1+\frac{1}{2})\pi}c(Q-d) \qquad (7)$$

wherein $$\phi_0, \phi_1 \in \left\{0+\frac{\phi}{\pi}, 1+\frac{\phi}{\pi}\right\},$$

which is determined by a modulation symbol and a modulation mode (a QPSK modulation mode in the example) of the UE2; d is an amplitude factor of a modulation symbol of the UE1, I and Q are determined by the modulation symbol of the UE1, and c represents an amplitude factor of the modulation symbol of the UE2.

A second method:

At the BS, after the symbols to be transmitted of the two UEs are mapped to the antenna array, the signal component on each antenna may be adjusted through the following formula (8), thereby implementing constellation rotation with the rotation angle φ:

$$x = e^{j\phi_0\pi}c(I \times e^{\varphi} - d) + e^{j(\phi_1+\frac{1}{2})\pi}c(Q \times e^{\varphi} - d) \qquad (8)$$

wherein $\varphi_0, \varphi_1 \in \{0,1\}$, which is determined by the modulation symbol and modulation mode (the QPSK modulation mode in the example) of the UE2, d is the amplitude factor of the modulation symbol of the UE1, I and Q are determined by the modulation symbol of the UE1, and c represents the amplitude factor of the modulation symbol of the UE2.

After constellation rotation on each antenna by the above-described methods, a signal x may be sent to each UE, thereby implementing downlink data transmission.

In order to reduce the calculation complexity, it may be determined that the constellation of one UE in the multiple UEs is not required to be rotated, and constellations of other UEs are rotated. In such case, the constellation of the UE not subjected to constellation rotation may be determined as a reference, and the constellation rotation angles of other UEs refer to rotation angles relative to the reference. Particularly, if the BS only schedules two UEs, the constellation of one UE may be determined as a reference, and it only needs to determine the rotation angle of the constellation of the other UE relative to the reference.

Figure 3:
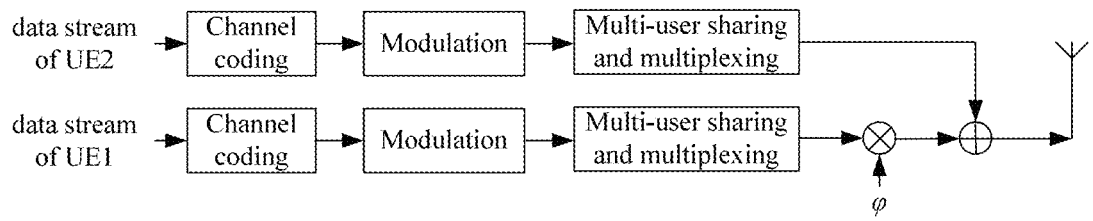
FIG. 3 shows a processing process when a BS processes a downlink data stream according to an embodiment of the present application.

FIG. 3 shows a processing process when the BS processes a downlink data stream. In FIG. 3, the BS processes two downlink data streams, wherein constellation rotation may be performed on the stream 1 which is sent to UE1, and constellation rotation may not be performed on stream 2 which is sent to UE2. From FIG. 3, it can be seen that after channel coding, modulation and multiplexing processed by a multi-user sharing module are performed on the data stream sent to the UEs, the constellation rotation angle of the UE1 is obtained according to the method presented by Steps 201 to 203, and the constellation thereof is rotated according to Step 204. Therefore, the signal sent by a transmitter of the BS is a mixed signal of the signal of the UE1 subjected to constellation rotation and the signal of the UE2 not subjected to constellation rotation. The multi-user sharing module is configured to multiplex multi-user data, and may specifically include, for example, a NOMA module, a Multi-User Shared Access (MUSA) coding module, a Low Density Signature Orthogonal Frequency Division Multiplexing (LDS-OFDM) coding module or an IGMA coding module.

Figure 4:
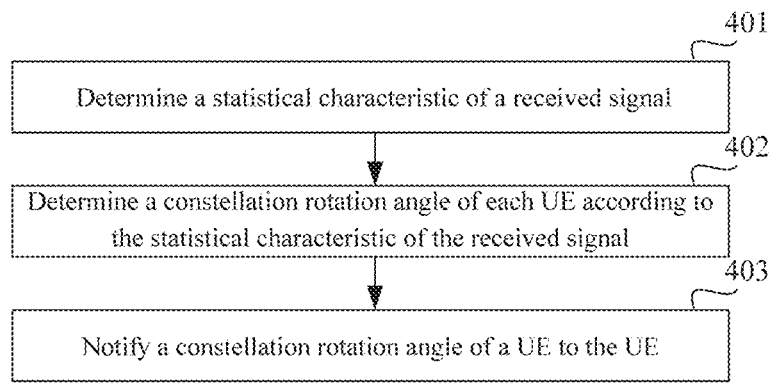
FIG. 4 shows a constellation rotation method applied to uplink data transmission according to an embodiment of the present application.

In addition, an embodiment of the present application also discloses another constellation rotation method. The method may be applied to uplink data transmission, and may be executed by a BS. FIG. 4 shows a constellation rotation method applied to uplink data transmission. As shown in FIG. 4, the method includes the following steps.

In Step 401, the BS determines a statistical characteristic of a received signal according to a channel coefficient of one or more UEs, at least one of noise information and interference information.

An implementation method for Step 401 may refer to the implementation method for Step 201 and thus will not be repeatedly described herein.

In Step 402, the BS determines a constellation rotation angle of each UE according to the statistical characteristic of the received signal.

An implementation method for Step 402 may refer to the implementation method for Step 202 and thus will not be repeatedly described herein.

Moreover, the constellation rotation angle of each UE may be determined by the operations in Step 401 and Step 402. That is, a constellation rotation angle determination method is provided by Step 401 and Step 402, and the method may be applied to uplink data transmission.

In Step 403, for each UE, the BS notifies a constellation rotation angle of a UE to the UE.

In some embodiments of the present application, the constellation rotation angle of certain UE may be notified to the UE by the following methods.

A First Method: An Explicit Notification Manner

In the method, the BS may quantize the constellation rotation angle of certain UE at first, and then send the quantized constellation rotation angle to the UE through a downlink signaling. In an example, in some embodiments of the present application, a quantization result of the constellation rotation angle may be represented through a bitmap.

As a transformation of the method, the BS may also not quantize the constellation rotation angle of the UE but directly bear an angle value in the downlink signaling to send to the UE. In an example, the constellation rotation angle may be sent through a differential signal. In an embodiment of the present application, the BS continuously sends two modulation symbols, and an angle difference between the two modulation symbols may be determined as the above-described constellation rotation angle.

Figure 5:
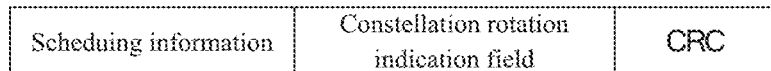
FIG. 5 shows an example of downlink signaling according to an embodiment of the present application.

The above-described downlink signaling may be a dynamic signaling, which may be implemented by defining a specific constellation-rotation configuration signaling or by an existing signaling. FIG. 5 shows an example of downlink signaling. From FIG. 5, it can be seen that the downlink signaling may be integrated with a scheduling signaling of the UE, i.e., a constellation rotation indication field is added into the existing scheduling signaling. The constellation rotation indication field may include an indicator bit, configured to instruct the UE to perform constellation rotation. In an example, when the indicator bit is "0", it is indicated that constellation rotation is not performed; and when the indicator bit is "1", it is indicated that constellation rotation is performed. The constellation rotation indication field may further include a rotation angle indication domain with a length of K bits, configured to bear the quantized or unquantized constellation rotation angle.

A Second Method: A Two-Stage Configuration Manner

In the method, the BS may configure a reference constellation rotation angle of the UE through a quasi-static downlink signaling at first, and then notify the UE an angle offset relative to the reference constellation rotation angle through a dynamic downlink signaling, so as to dynamically adjust the constellation rotation angle of the UE.

In the method, the BS may also notify the angle offset through the downlink signaling shown in FIG. 5. In such case, the rotation angle indication domain with the length of K bits is configured to bear the quantized angle offset.

A Third Method: A Codebook-Based Implicit Configuration Manner

In the method, the BS may predefine a codebook corresponding to different constellation rotation angles, and configure the predefined codebook to the UE. In such a manner, the BS may notify a codebook index corresponding to the present constellation rotation angle to the UE through the dynamic downlink signaling.

In the method, the BS may also notify the codebook index corresponding to the present constellation rotation angle through the signaling shown in FIG. 5. In such case, the rotation angle indication domain with the length of K bits is configured to bear the codebook index.

It is to be noted that, the above-described codebook corresponding to a constellation rotation angle may be a specifically defined. Or, as an alternative, a codebook may also be jointly designed for precoding and the constellation rotation angle. That is, through a single code index, precoding corresponding to the UE may be determined, and the constellation rotation angle corresponding to the UE may also be determined.

Correspondingly, in some embodiments of the present application, the UE may execute the following steps: receiving a constellation rotation angle corresponding to the UE from the BS; and after a symbol to be transmitted is mapped to an antenna array, the constellation of the data stream to the UE is rotated according to the constellation rotation angle.

The step of receiving the constellation rotation angle corresponding to the UE from the BS may be implemented in the following manners.

A First Manner:

A dynamic downlink signaling is received from the BS, and the corresponding constellation rotation angle is acquired from the dynamic downlink signaling. As described above, the downlink signaling may bear a quantized constellation rotation angle, and may also bear an unquantized constellation rotation angle. Moreover, the downlink signaling may be an extension of the existing signaling and may also be a new signaling.

A Second Manner:

A quasi-static downlink signaling is received from the BS, and the reference constellation rotation angle is acquired from the quasi-static downlink signaling; the dynamic downlink signaling is received from the BS, and the rotation angle offset is acquired from the dynamic downlink signaling; and the corresponding constellation rotation angle is determined according to the reference constellation rotation angle and the rotation angle offset.

A Third Manner:

A predefined codebook corresponding to different constellation rotation angles are received from the BS; the dynamic downlink signaling is received from the BS, and a codebook index corresponding to the corresponding constellation rotation angle is acquired from the dynamic downlink signaling; and the corresponding constellation rotation angle is determined according to the codebook and the codebook index.

After the constellation rotation angle notified by the BS is received, the UE may perform channel coding, modulation and multi-user multiplexing (mapping of the symbol to be transmitted to the antenna array), and then rotate the constellation according to the corresponding constellation rotation angle. A specific constellation rotation method may refer to the methods described in Step 204 and will not be repeatedly described herein.

Figure 6:
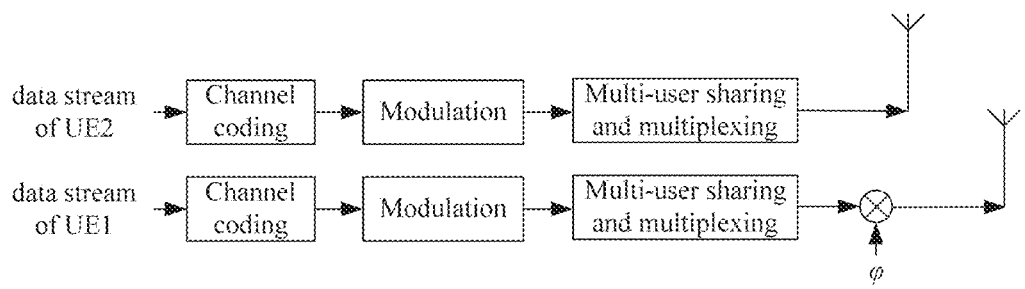
FIG. 6 shows a processing process when a UE processes an uplink data stream according to an embodiment of the present application.

FIG. 6 is a schematic diagram when UE processes an uplink data stream. In FIG. 6, constellation rotation may be performed on a stream 1 corresponding to UE1, and constellation rotation may not be performed on a stream 2 corresponding to UE2. From FIG. 6, it can be seen that channel coding, modulation and multiplexing processed by a multi-user sharing module are performed on the data stream of the UE, and then the constellation rotation angle of the UE1 is obtained according to the method presented by Steps 401 to 404, thus the constellation is rotated according to Step 204. Therefore, the signal received by a receiver of the BS is a mixed signal of the signal of the UE1 subjected to constellation rotation and the signal of the UE2 not subjected to constellation rotation.

As described above, according to the method of obtaining a constellation rotation angle by maximizing an entropy of a mixed-Gaussian model-based random variable of the received signal, the system performance and the throughput may be optimized. In addition, for the mixed-Gaussian model-based random variable of the received signal, both the influence of the noise and the influence of a channel coefficient of the UE are considered, so that a constellation rotation angle obtained accordingly may be applied to different signal-to-noise ratio conditions and different constellations, and high accuracy may be achieved under the condition of a relatively high signal-to-noise ratio or a relatively low signal-to-noise ratio. Therefore, the method is high in flexibility and applied to a wide range of a signal-to-noise ratio. Moreover, a constellation form is not limited, and the method may be applied to complex constellation forms, for example, QAM.

Furthermore, from the lower-bound expression of the mixed-Gaussian model-based random variable of the received signal, as shown as the formula (5), it can be seen that the expression is a closed-form expression, so that the calculation complexity when obtaining a constellation rotation angle by maximizing the expression is low, and it is substantially unrelated to a constellation rotation angle. Therefore, requirements on calculation and storage hardware resources of the BS are low, the calculation delay is short, and it is applicable to real-time applications.

From the foregoing detailed descriptions, it can be seen that the constellation rotation method, particularly the constellation rotation angle determination method, is described with multiplexing of two UEs as an example, and if the method is extended to a more general application scenario, i.e., more than two UEs multiplexing the same resource, the constellation rotation method may be correspondingly extended.

In some embodiments of the present application, the UE may be classified into different levels. For example, a UE of which performance is to be improved is classified into a first-level user, and is considered as a UE requiring constellation rotation in a mixed-Gaussian model-based random variable. Other UEs are classified into a second-level user, and their mixed signal is considered to correspond to a UE not requiring constellation rotation in the mixed-Gaussian model-based random variable. Hence, by adjusting the value of the above-described constellation rotation angle, the transmission performance of the first-level user may be maximized.

In some embodiments of the present application, a step-by-step way may be used when determining constellation rotation angles of multiple UEs based on the above-described mixed-Gaussian model. In an example, assume there are n UEs multiplexing a same resource, and n>2. First, other UEs except UE1 may be regarded as one UE, and the angle for UE1 may be adjusted according to the above-described method; second, other UEs except UE2 may be regarded as one UE, and the angle for UE2 may be adjusted according to the above-described method, and so on. Finally, other UEs except UEn are considered as one user, and a constellation rotation angle of UEn is adjusted according to the above-described method. Therefore, suboptimal rotation angles of n UEs are obtained step-by-step before signal superimposition.

The constellation rotation angle obtained by the above-described method for each UE is not optimal, but simulation experiments may show that, by using the constellation rotation angle obtained by the above-described method for each UE, the system performance may be greatly improved without increasing the calculation complexity in a large amount.

Figure 7:
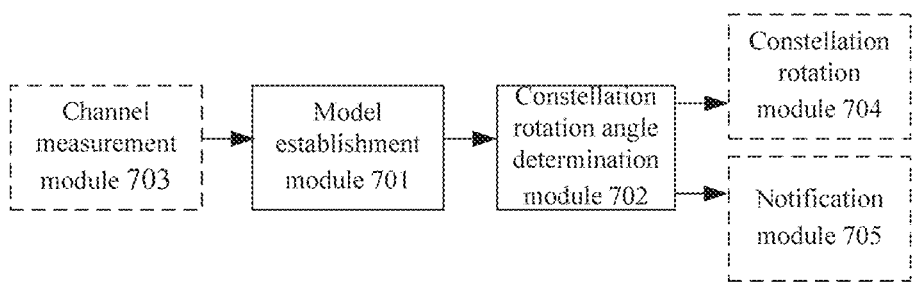
FIG. 7 shows a structure diagram of a constellation rotation device according to an embodiment of the present application.

Correspondingly, the present application discloses a constellation rotation device. The device may be a single device, and may also be a function module integrated with a BS. An internal structure of the device, as shown in FIG. 7, includes a model establishment module 701 and a constellation rotation angle determination module 702.

The model establishment module 701 is configured to determine a statistical characteristic of a received signal according to a channel coefficient of one or more UEs, at least one of noise information and interference information.

In some embodiments of the present application, the statistical characteristic of the received signal may specifically refer to an entropy of a random variable of the received signal determined by the BS according to the channel coefficient of the one or more UEs, at least one of the noise information and the interference information. In some embodiments, determining the entropy of the random variable of the received signal may include the following two steps: determining a distribution function of the random variable of the received signal; and determining the entropy of the random variable of the received signal according to the distribution function of the random variable of the received signal. The distribution function of the random variable of the received signal is determined according to the number of elements in a constellation point set at the receiver after all possible constellation points sent by each UE pass a physical channel and the distribution function of the noise and/or the interference. In particular, for the scenario of MUST, the multi-user signal may be modeled as a mixed-Gaussian model. In this case, the above-described distribution function of the noise and/or the interference is a circular symmetric Gaussian distribution function, of which a mean value is a sum of the signals of UEs received by the receiver, and of which a variance is a noise variance. The entropy of the random variable may be obtained by a distribution function of the random variable of the received signal.

For further reducing the calculation complexity, in some embodiments of the present application, a closed-form lower-bound expression of the entropy of the random variable of the received signal, given by the formula (5) may be used to represent the entropy of the random variable of the received signal.

In addition, in some other embodiments of the present application, the statistical characteristic of the received signal may specifically refer to an Mth-order center distance of the received signal determined by the BS according to the channel coefficient of the one or more UEs, at least one of the noise information and the interference information, wherein M is a natural number more than or equal to 2.

The constellation rotation angle determination module 702 is configured to determine a constellation rotation angle of each UE according to the determined statistical characteristic.

The constellation rotation angle determined by the device may be applied to both downlink data transmission and uplink data transmission.

The BS may further include a channel measurement module 703, configured to obtain the channel coefficient of each UE by channel measurement, thereby determining the constellation rotation angle.

For downlink data transmission, the constellation rotation device may further include a constellation rotation module 704, configured to for each UE, rotate a constellation of a data stream of a UE according to the constellation rotation angle of the UE. After the constellation of each UE is rotated, a transmission module of the BS superimposes the signal of UEs subjected to constellation rotation, and sends the superimposed signal.

In the embodiments of the present application, the constellation rotation module 704 may rotate the constellation of the data stream of the UE according to the foregoing methods.

In addition, for uplink data transmission, the device may further include a notification module 705, configured to notify the constellation rotation angle of a UE to the UE. In some embodiments of the present application, the notification module 705 may notify the constellation rotation angle of a certain UE to the UE according to the foregoing methods.

Figure 8:
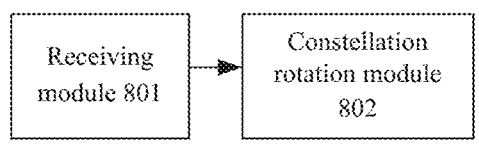
FIG. 8 shows a structure diagram of a constellation rotation device according to an embodiment of the present application.

Correspondingly, the present application discloses a constellation rotation device, which is applied to uplink data transmission. The device may be a function module integrated with UE. An internal structure of the device, as shown in FIG. 8, mainly includes:

a receiving module 801, configured to receive a constellation rotation angle of a UE from a BS; and a constellation rotation module 802, configured to rotating a constellation of a data stream of the UE according to the constellation rotation angle.

In some embodiments of the present application, as described above, the receiving module 801 may receive the constellation rotation angle from the BS in multiple manners. The constellation rotation module 802 may also perform constellation rotation in multiple manners. Repeated descriptions are omitted herein.

Corresponding to the constellation rotation method, the BS and UE device, the present application also discloses a computer-readable storage medium, in which a computer instruction is stored, the computer instruction being executed by a processor to implement the steps of the method shown in FIG. 2 or FIG. 4 and the other methods described herein.

It should be noted that, in the above-described flow and diagram, not all the steps or modules are necessary, some of which may be omitted according to the practical needs. The order to perform the steps is not fixed, and may be adjusted according to the practical needs. The division of modules is only for ease of description of separate functions. In practical implementation, a module may be implemented by multiple sub-modules, and functions of some modules may be implemented by one module. These modules may be within one device, or within different devices.

In addition, the block diagrams that have been used to describe the above embodiments illustrate blocks in functional units. These functional blocks (components) may be implemented in arbitrary combinations of hardware and/or software. Also, the means for implementing each functional block is not particularly limited. That is, each functional block may be implemented by one piece of apparatus that is physically and/or logically aggregated, or may be implemented by directly and/or indirectly connecting two or more physically and/or logically separate pieces of apparatus (via wire or wireless, for example) and using these multiple pieces of apparatus.

Figure 9:
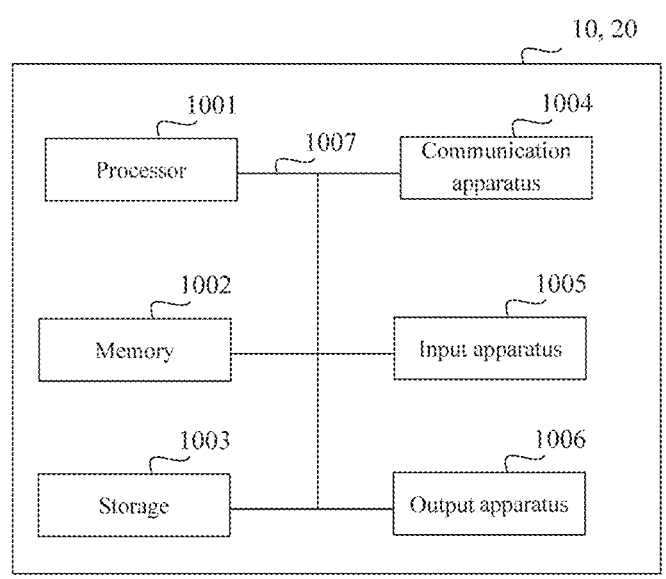
FIG. 9 shows a hardware structure diagram of a wireless BS and UE according to an embodiment of the present application.

For example, a radio base station, a user equipment and so on according to an embodiments of the present disclosure may function as a computer that executes the processes of the radio communication method of the present disclosure. FIG. 9 is a diagram to illustrate an example hardware structure of a radio base station and a user equipment according to an embodiment of the present disclosure. Physically, the above-described radio base station 10 and user equipment 20 may be formed as a computer apparatus that includes a processor 1001, a memory 1002, a storage 1003, a communication apparatus 1004, an input apparatus 1005, an output apparatus 1006 and a bus 1007.

In addition, in the following description, the word "apparatus" may be replaced by "circuit", "device", "unit", and so on. Note that the hardware structures of a radio base station 10 and a user equipment 20 may be designed to include one or more of each apparatus illustrated in the drawing, or may be designed not to include a part of the apparatus.

For example, although only one processor 1001 is illustrated, a plurality of processors may be provided. Furthermore, processes may be implemented with one processor, or processes may be implemented in sequence, or in different manners, on more than one processor. Note that the processor 1001 may be implemented with more than one chip.

Each function of the radio base station 10 and the user equipment 20 is implemented for example by reading predetermined software (programs) on hardware such as the processor 1001 and the memory 1002, so as to allow the processor 1001 to do calculations to control communications performed by the communication apparatus 1004, and control reading and/or writing data from the memory 1002 and the storage 1003.

The processor 1001 may control the whole computer by, for example, running an operating system. The processor 1001 may be formed with a central processing unit (CPU) which includes interfaces with a peripheral apparatus, a control apparatus, a computing apparatus, a register, and so on. For example, the above-described baseband signal processing unit 104 (204), call processing unit 105 and others may be implemented by the processor 1001.

Furthermore, the processor 1001 reads programs (program codes), software modules or data, from the storage 1003 and/or the communication apparatus 1004, into the memory 1002, and executes various processes according to them. As the programs, programs that allow a computer to execute at least part of the operations of the above-described embodiments may be used. For example, the control unit 401 of the user equipment 20 may be implemented by control programs that are stored in the memory 1002 and that operate through the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as "register", "cache", "main memory (primary storage apparatus)", and so on. The memory 1002 may store executable programs (program codes), software modules, and so on for implementing the radio communication methods according to embodiments of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disk ROM), and so on), a digital versatile disc, a Blu-ray (registered trademark) disk), a removable disk, a hard disk driver, a smart card, a flash memory device (for example, a card, a stick, a key driver, etc.), a magnetic stripe, a database, a server, and/or other appropriate storage media. The storage 1003 may be referred to as "secondary storage apparatus".

The communication apparatus 1004 is hardware (transmitting/receiving device) for allowing inter-computer communications by using wired and/or wireless networks, and may be referred to as, for example, "network device", "network controller", "network card", "communication module", and so on. The communication apparatus 1004 may include a high frequency switch, a duplexer, a filter, a frequency synthesizer, and so on, in order to realize, for example, frequency division duplex (FDD) and/or time division duplex (TDD). For example, the above-described transmitting/receiving antennas 101 (201), amplifying unit 102 (202), transmitting/receiving unit 103 (203), communication path interface 106, and so on may be implemented by the communication apparatus 1004.

The input apparatus 1005 is an input device for receiving input from the outside (for example, a keyboard, a mouse, a microphone, a switch, a button, a sensor, and so on). The output apparatus 1006 is an output device that implements output to the outside (for example, a display, a speaker, an LED (Light Emitting Diode) lamp, and so on). The input apparatus 1005 and the output apparatus 1006 may be provided in an integrated structure (for example, a touch panel).

Furthermore, the pieces of apparatus such as the processor 1001, the memory 1002 and others, are connected by the bus 1007 for communicating information. The bus 1007 may be formed with a single bus, or may be formed with different buses between pieces of apparatus.

Also, the radio base station 10 and the user equipment 20 may be structured to include hardware such as a microprocessor, a digital signal processor (DSP), an ASIC (Application-Specific Integrated Circuit), a PLD (Programmable Logic Device), and an FPGA (Field Programmable Gate Array), and so on, and part or all of the functional blocks may be implemented by the hardware. For example, the processor 1001 may be implemented with at least one of these pieces of hardware.

In addition, the terminology used in this specification and the terminology that is needed to understand this specification may be replaced by other terms that convey the same or similar meanings. For example, "channel" and/or "symbol" may be replaced by "signal (or "signaling")." Also, "signal" may be "message". "Reference signal" may be abbreviated as "RS", and may be referred to as "pilot", "pilot signal", and so on, depending on which standard applies. Furthermore, "component carrier (CC)" may be referred to as "cell", "frequency carrier", "carrier frequency", and so on.

Furthermore, a radio frame may be constituted by one or more periods (frames) in the time domain. Each of the one or more periods (frames) constituting the radio frame may be referred to as a subframe. Furthermore, a subframe may be constituted by one or more slots in the time domain. The subframe may be a fixed length of time (e.g., 1 ms) independent of the numerology.

Furthermore, a slot may be constituted by one or more symbols (OFDM (Orthogonal Frequency Division Multiplexing) symbols, SC-FDMA (Single Carrier Frequency Division Multiple Access) symbols, and so on) in the time domain. In addition, the time slot may also be a time unit based on the numerology. Also, the time slot may also include a plurality of minislots. Each minislot may be constituted by one or more symbols in the time domain. In addition, a minislot may also be referred to as a subslot.

"radio frame", "subframe", "slot", "minislot" and "symbol" all represent time units in signal communication. "radio frame", "subframe", "slot", "minislot" and "symbol" may be each called by other applicable names. For example, one subframe may be referred to as a transmission time interval (TTI), a plurality of consecutive subframes may be referred to as a TTI, or one slot or one minislot may be referred to as a TTI. That is, a subframe and/or a TTI may be a subframe (1 ms) in existing LTE, may be a period shorter than 1 ms (for example, one to thirteen symbols), or may be a period longer than 1 ms. In addition, a unit indicating a TTI may also be referred to as a slot, a minislot, or the like, instead of a subframe.

Herein, a TTI refers to the minimum time unit of scheduling in radio communication. For example, in LTE systems, a radio base station schedules the allocation of radio resources (such as the frequency bandwidth and transmission power that can be used by each user equipment) for each user equipment in TTI units. In addition, the definition of TTI is not limited to this.

The TTI may be the transmission time unit of channel-encoded data packets (transport blocks), code blocks and/or codewords, or may be the processing unit of scheduling, link adaptation, and so on. In addition, when a TTI is given, a time interval (e.g., the number of symbols) actually mapped to the transport blocks, code blocks, and/or codewords may also be shorter than the TTI.

In addition, when one time slot or one mini time slot is called a TTI, more than one TTI (i.e., more than one time slot or more than one mini time slot) may also be a minimum time unit for scheduling. Further, the number of slots (the number of minislots) constituting the minimum time unit for scheduling can be controlled.

A TTI having a time length of 1 ms may be referred to as a normal TTI (TTI in LTE Rel. 8 to 12), a standard TTI, a long TTI, a normal subframe, a standard subframe, or a long subframe, and so on. A TTI that is shorter than the normal TTI may be referred to as a compressed TTI, a short TTI, a partial TTI/fractional TTI, a compressed subframe, a short subframe, a mini time slot, or a subslot, and so on.

In addition, a long TTI (e.g., a normal TTI, a subframe, etc.) may be replaced with a TTI having a time length exceeding 1 ms, and a short TTI (e.g., a compressed TTI, etc.) may also be replaced with a TTI having a TTL length shorter than that of a long TTI and longer than 1 ms.

A resource block (RB) is the unit of resource allocation in the time domain and the frequency domain, and may include one or a plurality of consecutive subcarriers in the frequency domain. In addition, an RB may include one or more symbols in the time domain, and may be one slot, one minislot, one subframe, or one TTI in length. One TTI and one subframe each may be constituted by one or more resource blocks. Besides, one or more RBs may be referred to as a Physical RB (PRB), a Sub-Carrier Group (SCG), a Resource Element Group (REG), a PRB pair, an RB pair, and so on.

Furthermore, a resource block may be constituted by one or more resource elements (REs). For example, one RE may be a radio resource field of one subcarrier and one symbol.

In addition, the above-described structures of the radio frame, the subframe, the slot, the minislot, the symbol, and so on are merely examples. For example, configurations such as the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration and the cyclic prefix (CP) duration may be changed in various ways.

Further, the information and parameters described in this specification may be represented in absolute values, or in relative values with respect to predetermined values, or may be represented in other information formats. For example, radio resources may be indicated by predetermined indexes. In addition, equations to use these parameters and so on may be different from those explicitly disclosed in this specification.

The names used for the parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in this specification may be represented by using a variety of different technologies. For example, the data, commands, instructions, information, signals, bits, symbols and chips, all of which may be referenced throughout the herein-contained description, may be represented by voltages, currents, electromagnetic waves, magnetic fields or particles, optical fields or photons, or any combination of these.

Also, the information, signals, and so on may be output from higher layers to lower layers and/or from lower layers to higher layers. The information, signals, and so on may be input and output via a plurality of network nodes.

The information, signals, and so on that are input and/or output may be stored in a specific location (for example, a memory), or may be managed using a management table. The information, signals, and so on to be input and/or output can be overwritten, updated or appended. The information, signals, and so on that are output may be deleted. The information, signals, and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," and so on. Also, RRC signaling may be referred to as "RRC messages", and may be, for example, an RRC connection setup message, an RRC connection reconfiguration message, and so on. Also, MAC signaling may be reported using, for example, MAC control elements (MAC CEs).

Also, reporting of predetermined information (for example, reporting "is X") does not necessarily have to be sent explicitly, and may be sent implicitly (by, for example, not reporting the predetermined information or by reporting other information).

Decisions may be made in values represented by one bit (0 or 1), may be made in Boolean values that represent true or false, or may be made by comparing numerical values (for example, comparison against a predetermined value).

Software, whether it is referred to as "software", "firmware", "middleware", "microcode", or "hardware description language", or called by other names, should be interpreted broadly, to mean instructions, instruction sets, codes, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)", "radio base station", "eNB", "cell", "sector", "cell group", "carrier", and "component carrier" may be used interchangeably. A base station may be referred to as a "fixed station", "NodeB", "eNodeB (eNB)", "access point", "transmission point", "receiving point", "femto cell", "small cell", and so on.

A base station can accommodate one or more (for example, three) cells (also referred to as "sectors"). When a base station accommodates a plurality of cells, the entire coverage area of the base station may be partitioned into multiple smaller areas, and each smaller area may provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)", "user terminal", "user equipment (UE)" and "equipment" may be used interchangeably. "Base station" may be referred to as "fixed station", "NodeB", "eNodeB (eNB)", "access point", "transmission point", "receiving point", "femto cell", "small cell", and so on.

"Mobile station" may be referred to, by a person skilled in the art, as "subscriber station", "mobile unit", "subscriber unit", "wireless unit", "remote unit", "mobile device", "wireless device", "wireless communication device", "remote device", "mobile subscriber station", "access equipment", "mobile equipment", "wireless equipment", "remote equipment", "handset", "user agent", "mobile client", "client" or some other suitable terms.

Furthermore, the radio base stations in this specification may be interpreted as user equipments. For example, each aspect/embodiment of the present disclosure may be applied to a configuration in which communications between a radio base station and a user equipment are replaced with communications between a plurality of user equipments (D2D (Device-to-Device)). In this case, the user equipment 20 may have the functions of the radio base station 10 described above. In addition, wording such as "uplink" and "downlink" may be interpreted as "side". For example, an uplink channel may be interpreted as a side channel.

Likewise, the user equipments in this specification may be interpreted as radio base stations. In this case, the radio base station 10 may have the functions of the user equipment 20 described above.

Certain actions which have been described in this specification to be performed by base stations may, in some cases, be performed by upper nodes. In a network consisting of one or more network nodes with base stations, it is clear that various operations that are performed to communicate with the user equipments can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The phrase "based on" as used in this specification does not mean "based only on", unless otherwise specified. In other words, the phrase "based on" means both "based only on" and "based at least on".

Reference to elements with designations such as "first", "second", and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The term "determining" as used herein may encompass a wide variety of actions. For example, to "determining" as used herein may be interpreted to mean making determinations related to calculating, computing, processing, deriving, investigating, looking up (for example, searching a table, a database or some other data structure), ascertaining, and so on. Furthermore, to "determining" as used herein may be interpreted to mean making determinations related to receiving (for example, receiving information), transmitting (for example, transmitting information), inputting, outputting, accessing (for example, accessing data in a memory), and so on. In addition, to "determining" as used herein may be interpreted to mean making determinations related to resolving, selecting, choosing, establishing, comparing, and so on.

In other words, to "determining" as used herein may be interpreted to mean making determinations related to some actions.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access. As used herein, two elements may be considered "connected" or "coupled" to each other by using one or more electrical wires, cables and/or printed electrical connections, and, in a number of non-limiting and non-inclusive examples, by using electromagnetic energy such as electromagnetic energy having wavelengths in the radio frequency, microwave and/or optical regions (both visible and invisible).

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Although the present disclosure has been described in detail above, it should be obvious to a person skilled in the art that the present disclosure is by no means limited to the embodiments described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way.

The invention claimed is:

1. A constellation rotation method, comprising:
   determining a statistical characteristic of a received signal of a Base Station (BS) according to a channel coefficient of one or more User Equipments (UEs), at least one of noise information and interference information, the received signal being a signal received by the BS through a physical channel from the one or more UEs;
   determining a constellation rotation angle of each UE according to the determined statistical characteristic of the received signal; and
   for each UE, rotating a constellation of a data stream of a UE according to the constellation rotation angle of the UE;
   wherein determining the statistical characteristic of the received signal of the Base Station (BS) according to the channel coefficient of the one or more User Equipments (UEs), at least one of noise information and interference information comprises:
   determining an entropy of a random variable of the received signal according to the channel coefficient of the one or more UEs, at least one of the noise information and the interference information;
   determining the constellation rotation angle of each UE according to the determined statistical characteristic of the received signal comprises:
   determining the constellation rotation angle of each UE by maximizing the entropy.

2. The method of claim 1, wherein determining the entropy of the random variable of the received signal according to the channel coefficient of the one or more UEs, at least one of the noise information and the interference information comprises:
    determining a distribution function of the random variable of the received signal; and
    determining the entropy of the random variable of the received signal according to the distribution function of the random variable of the received signal.

3. The method of claim 1, further comprising:
    approximating the entropy of the random variable of the received signal to obtain a closed-form lower-bound expression, and using the closed-form lower-bound expression to represent the entropy of the random variable of the received signal, wherein
    determining the constellation rotation angle of each UE according to the determined statistical characteristic of the received signal comprises:
    determining the constellation rotation angle of each UE by maximizing the entropy by using the closed-form lower-bound expression.

4. The method of claim 2, wherein determining the distribution function of the random variable of the received signal comprises:
    determining the distribution function, according to the number of elements in a constellation point set received by the BS after all possible constellation points sent by each UE pass the physical channel, and a distribution function of a noise and/or interference.

5. The method of claim 4, wherein the distribution function of the noise and/or the interference is represented by a circular symmetric Gaussian distribution function, of which a mean value is a sum of signals of UEs received by the BS, and a variance is a noise variance.

6. The method of claim 1, further comprising:
    superimposing the signals of UEs subjected to constellation rotation, and sending the superimposed signal.

7. A constellation rotation method, comprising:
    receiving a constellation rotation angle corresponding to a User Equipment (UE) from a Base Station (BS), wherein a received signal is a signal received by the BS through a physical channel from one or more (UE), an entropy of a random variable of the received signal is determined by the BS according to a channel coefficient of the one or more UEs, at least one of noise information and interference information, and the constellation rotation angle is determined by the BS by maximizing the entropy; and
    rotating a constellation of a data stream of the UE according to the constellation rotation angle.

8. The method of claim 7, wherein receiving the constellation rotation angle corresponding to the UE from the BS comprises:
    receiving a dynamic downlink signaling from the BS, and acquiring the constellation rotation angle from the dynamic downlink signaling.

9. The method of claim 7, wherein receiving the constellation rotation angle corresponding to the UE from the BS comprises:
    receiving a quasi-static downlink signaling from the BS, and acquiring a reference constellation rotation angle from the quasi-static downlink signaling;
    receiving a dynamic downlink signaling from the BS, and acquiring a rotation angle offset from the dynamic downlink signaling; and
    determining the constellation rotation angle according to the reference constellation rotation angle and the rotation angle offset.

10. The method of claim 7, wherein receiving the constellation rotation angle corresponding to the UE from the BS comprises:
    receiving a predefined codebook corresponding to constellation rotation angles from the BS;
    receiving a dynamic downlink signaling from the BS, and acquiring a codebook index corresponding to the constellation rotation angle from the dynamic downlink signaling; and
    determining the constellation rotation angle according to the codebook corresponding to constellation rotation angles and the codebook index corresponding to the constellation rotation angle.

11. A Base Station (BS), comprising:
    a processor;
    a memory connected with the processor, wherein machine-readable instruction modules are stored in the memory, and the machine-readable instruction modules comprise:
    a model establishment module, configured to determine a statistical characteristic of a received signal of a Base Station (BS) according to a channel coefficient of one or more User Equipments (UEs), at least one of noise information and interference information, the received signal being a signal received by the BS through a physical channel from the one or more UEs;
    a constellation rotation angle determination module, configured to determine a constellation rotation angle of each UE according to the determined statistical characteristic of the received signal; and
    a constellation rotation module, configured to for each UE, rotate a constellation of a data stream of a UE according to the constellation rotation angle of the UE;
    wherein the model establishment module is configured to determine an entropy of a random variable of the received signal according to the channel coefficient of the one or more UEs, at least one of the noise information and the interference information;
    the constellation rotation angle determination module is configured to determine the constellation rotation angle of each UE by maximizing the entropy.

12. The BS of claim 11, further comprising:
    a measurement module, configured to obtain the channel coefficient of each UE by channel measurement.

13. The BS of claim 11, further comprising:
    a notification module, configured to notify the constellation rotation angle of a UE to the UE.

* * * * *